(12) United States Patent
McCown et al.

(10) Patent No.: US 10,931,650 B1
(45) Date of Patent: Feb. 23, 2021

(54) APPARATUS AND METHOD FOR BUILDING, EXTENDING AND MANAGING INTERACTIONS BETWEEN DIGITAL IDENTITIES AND DIGITAL IDENTITY APPLICATIONS

(71) Applicant: Anonyome Labs, Inc., Draper, UT (US)

(72) Inventors: Steven Harvey McCown, Mapleton, UT (US); Paul Ashley, Toowong (AU); Steve Shillingford, Draper, UT (US); Greg Clark, San Francisco, CA (US)

(73) Assignee: ANONYOME LABS, INC., Draper, UT (US)

( * ) Notice: Subject to any disclaimer, the term of this patent is extended or adjusted under 35 U.S.C. 154(b) by 141 days.

(21) Appl. No.: 15/714,933

(22) Filed: Sep. 25, 2017

Related U.S. Application Data

(60) Provisional application No. 62/553,032, filed on Aug. 31, 2017.

(51) Int. Cl.
  *G06F 21/62* (2013.01)
  *H04L 29/06* (2006.01)
  *G06F 21/60* (2013.01)

(52) U.S. Cl.
  CPC ............ *H04L 63/06* (2013.01); *G06F 21/602* (2013.01); *G06F 21/6245* (2013.01); *H04L 63/083* (2013.01)

(58) Field of Classification Search
  CPC . H04L 63/0421; H04L 63/04; H04L 63/0407; H04L 63/0884
  See application file for complete search history.

(56) References Cited

U.S. PATENT DOCUMENTS

| | | | |
|---|---|---|---|
| 9,372,987 B1 | 6/2016 | Ashley et al. | |
| 9,374,689 B1 | 6/2016 | Ashley et al. | |
| 9,703,986 B1 | 7/2017 | Ashley et al. | |
| 9,729,519 B1 | 8/2017 | Ashley et al. | |
| 10,178,106 B1 | 1/2019 | Ashley et al. | |
| 10,320,753 B1 | 6/2019 | Ashley et al. | |
| 2010/0042833 A1* | 2/2010 | Platt | H04L 63/0421 713/168 |
| 2014/0337466 A1* | 11/2014 | Li | G06F 21/31 709/217 |
| 2016/0063239 A1* | 3/2016 | Chen | G06F 21/31 726/6 |

* cited by examiner

*Primary Examiner* — Olugbenga O Idowu
(74) *Attorney, Agent, or Firm* — Cooley LLP

(57) ABSTRACT

An apparatus includes a processor and a memory connected to the processor. The memory stores instructions executed by the processor to store identity attributes including real identity attributes for a real individual and a digital identity with digital identity data attributes operative as a personal privacy proxy for the real individual. A digital identity management system is hosted to communicate with digital identity applications that observe a common application program interface. Each digital identity application implements at least one digital network function for the digital identity.

15 Claims, 14 Drawing Sheets

APPARATUS AND METHOD FOR BUILDING, EXTENDING AND MANAGING INTERACTIONS BETWEEN DIGITAL IDENTITIES AND DIGITAL IDENTITY APPLICATIONS

CROSS-REFERENCE TO RELATED APPLICATION

This application claims priority to U.S. Provisional Patent Application Ser. No. 62/553,032, filed Aug. 31, 2017, the contents of which are incorporated herein by reference.

FIELD OF THE INVENTION

This invention relates generally to communications in computer networks. More particularly, this invention is directed toward building, extending and managing interactions between digital identities and digital identity applications.

BACKGROUND OF THE INVENTION

Initially, a number of terms will be defined. As used herein, "Identity" refers to the characteristics determining who or what a person or thing is. A "Legal Identity" is a set of identifying attributes, as designated by a $3^{rd}$ Party, which are used for verification, validation and authentication. A "Digital Legal Identity" is a digital equivalent of a Legal Identity. A "Digital Identity" is a role-based digital identity that is created, controlled and managed by an individual and is used for verification, validation and authentication. Every individual has real identity attributes, such as name, email address, physical address, telephone number and the like. A digital identity has digital identity attributes operative as a personal privacy proxy with compartmental identity attributes. For example, a first digital identity may have a name, email address, physical address and telephone number different than the real identity attributes and also different than a second digital identity.

Users of computing-based systems perform a number of actions or select a number of identifying properties that can help distinguish them and their activities from those of other users. Such actions or selections include: choosing one or more computing hardware platforms (e.g., a laptop, tablet, or mobile phone), selecting software applications to install on their platform, enrolling in or connecting to online/cloud services, configuring those applications/services to their personal preference, and then using that combination of hardware, software, and services for their own desired purpose. As users acquire, configure, and use their computing platforms, they are inadvertently creating a type of fingerprint that can be used to uniquely (or closely) distinguish them from other computing platform users. This collection of data points (and optionally others) can be used to establish or infer their Legal Identity fingerprint online.

If networked sites and services can collect sufficient data so as to determine (or infer) a user's Legal Identity online, then they can track users across a myriad of networked sites and services. By tracking users in this manner, networked sites and services can identify or determine a potentially unlimited set of Personally Identifiable Information (PII) about users, which can be a gross or undesired invasion of privacy. Such PII can divulge an unlimited set of information about a user, such as: medical history, personal finance, employment, social relationships, etc. Usually, this type of PII is information that the user may prefer not be known or used by unknown networked sites and services.

A Digital Identity is a type of fingerprint that is intentionally different to some degree than a user's Legal Identity's fingerprint. A Digital Identity can be created for a user by altering one or more of the variable data comprising a Legal Identity. How different a Digital Identity is from a Legal Identity depends on how many or to what degree a user's actions or other identifying properties are changed from those normally comprising their Legal Identity. A Digital Identity can range from being slightly different (e.g., similar user with a different name) to very different by using a different set of hardware, software, and services.

Today's Internet contains a vast collection of highly sophisticated mechanisms that collect information about online users. These collection mechanisms are so sophisticated that using conventional means to block the collection of PII about users is mostly impossible for all but the most technically expert of internet user. The implication is that the average user doesn't have a reasonable chance to block the collection of their PII in the long run. Tools that detect tracking activities exist and are widely used. However, they will always suffer from the "cat and mouse" game with trackers in that while tracker detectors may detect today's tracking objects, they are unlikely to detect new and emerging tracking technologies. This understandable failure to block new or emerging tracking technologies will leave users somewhat unprotected for an indeterminate period of time.

In addition to use cases where users do not want to be tracked at all to maintain absolute privacy, there are also use cases for Digital Identities where users do want to be tracked. As an example, such use cases include situations where users may be researching a medical condition and they do want to preserve their search history, mark favorites, set bookmarks, be offered search results relevant to their previous searching, receive discount coupons for remedies, be offered new research material, or even be pointed at doctors or hospitals specializing in their condition. In other words, they do want the web and their web tools to work exactly as they would without a Digital Identity (including tracking) and the reason they use a Digital Identity mechanism is to compartmentalize one set of web access activities from another. For example, using the compartmentalization model of Digital Identity usage, a user can create one Digital Identity for medical research, one for hobbies, one for work activities, etc. and all of the web data (e.g., history, bookmarks, cookies, settings, etc.) for each Digital Identity will be kept separate from every other Digital Identity. The net result of this compartmentalization is that work-related activities, for example, will not cross-over into medical research activities and vice versa.

Unlike traditional tracker detection mechanisms, a Digital Identity Application Management System (DIAMS), does not exclusively rely on its ability to detect and block tracking technologies (although it may incorporate this functionality). The main benefit of a Digital Identity Application Management System is that it creates an alternative identity data set for the user, which by definition will also maintain an alternate set of PII. With this method, if a new tracker technology emerges that the SIMS is not able to detect and block, then the PII collected by this new tracker may be of little use to the sponsoring tracker technology service. This is a result of the user deciding how much of their Legal Identity is exposed by the Digital Identity combined with the user creating new Digital Identities for different online activities. In this manner, a Digital Identity Management Service provides a greatly enhanced benefit for the user in that it inhibits a tracker technology from being able to collect the Legal Identity PII about the user, since the Legal Identity PII is simply not available for collection.

Using Digital Identities for online activities is a much simpler method of protecting a user's PII than simply trying to detect and block the tracking activities, themselves. In order to describe the usage and managing infrastructure for a Digital Identity, it is important to define what types of elements may constitute a Digital Identity. A Digital Identity is a mechanism that accomplishes (but not limited to) a set or subset of the following:

A user-unique collection of data and/or information that enables a user to
  Setup and/or operate their computing device
  Connect to and/or interact with various online services
  Exchange data and/or information with various online services
  Manage any type of PII necessary for a user to operate their device(s), account(s), or online services
  Manage any type of data or information stored by a remote service on a user's device(s)
  Interact with other web users
The managing container and/or processes that manage the user-unique collection of data that comprise a Digital Identity
A set of mechanisms to create, update, delete, access, or control access to the elements of a Digital Identity.

Below is a sample set of potential elements and activities that can be used to define a particular Digital Identity. Any given Digital Identity may contain all, some, or none of the following items and may also include or substitute its own unique set of items that will serve to define the Digital Identity. Just as a fingerprint has an unlimited set of variations, a Digital Identity's identifying properties or fingerprint may also have a wide range of identifying properties or elements and therefore is not limited to the example set provided.

One embodiment of a Digital Identity element description is provided followed by a value (in parenthesis) that represents the cardinal relationship of any given element to a particular Digital Identity. This relationship can be described, for example, as one-to-one (1:1), one-to-many (1:M), zero-to-one (0:1), or zero-to-many (0:M). The cardinality value is followed by a sample description of each item.

Identity Number (1:1): the Identity Number used to uniquely identify a Digital Identity
Name (0:1): first, middle, last, etc.
Address (0:M): house #, street, city, state, country, etc.
Phone Number (0:M): country code, area code, number
Email Address (0:M): a MIME (or other standard) formatted electronic message delivery address
Messaging Credentials (0:M): normally, this is a type of user name or number, but this will vary by the Messaging Service's standards or requirements.
Social Media ID (0:M): email, user name, phone number, etc.
Payment Accounts (0:M): type, routing #, account #, etc.
Digital Finance Accounts (0:M): e.g., PayPal, Bitcoin, etc.
Encryption Keying Material (0:M): public/private keys, signing certificates, Key generation mechanisms
Privacy Settings (0:M): online tracking preferences (e.g., all, some, none); which data in the Digital Identity Data Attributes is available for disclosure, which data is masked, which data is substituted
Security/Privacy Mechanisms (0:M): proxy information, VPN, etc.
Online Activity History (0:M): browsing history, searches, data stored by remote sites, etc.
Personal Attributes (0:M): age, gender, race, hair color, eye color, glasses, etc.
Resume Items (0:M): work history, companies, accomplishments
Education (0:M): schools attended, courses, degrees, diplomas, certifications Given parameters of these types, it would be desirable to develop new techniques for building, extending and managing digital identities, interactions between digital identities and interactions with digital identity applications.

SUMMARY OF THE INVENTION

An apparatus includes a processor and a memory connected to the processor. The memory stores instructions executed by the processor to store identity attributes including real identity attributes for a real individual and a digital identity with digital identity data attributes operative as a personal privacy proxy for the real individual. A digital identity management system is hosted to communicate with digital identity applications that observe a common application program interface. Each digital identity application implements at least one digital network function for the digital identity.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
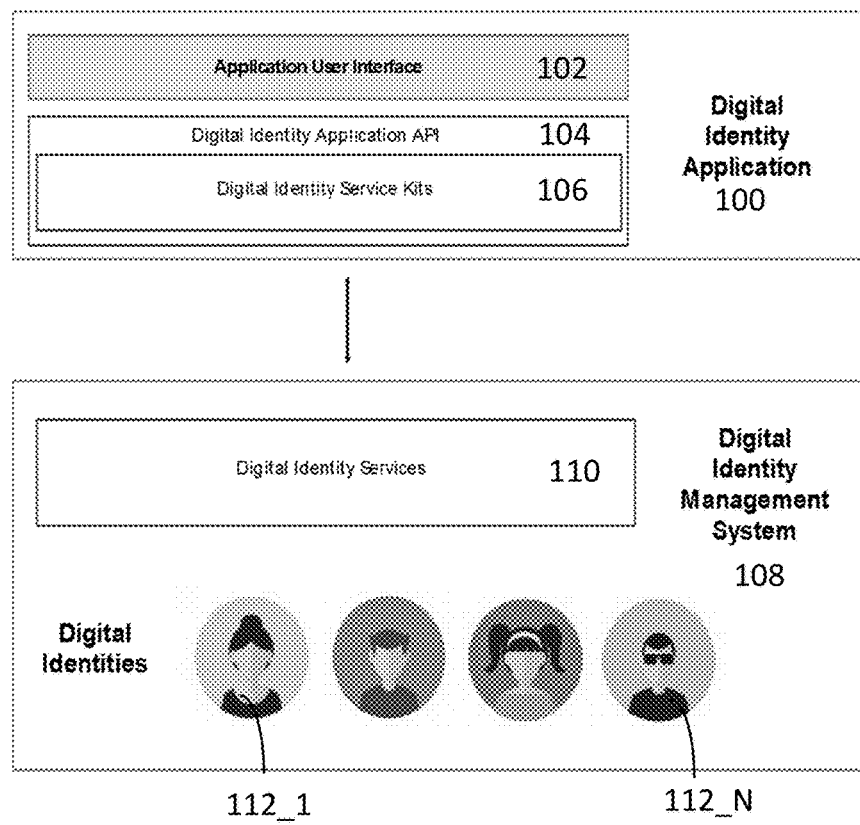
FIG. 1 illustrates a digital identity application management system configured in accordance with an embodiment of the invention.

As described above, a Digital Identity is a set of data, management functions, and a container that maintains a Digital Identity's elements (a.k.a., Digital Identity Data Attributes (DIDA)). In order to illustrate how Digital Identities may relate to and differentiate themselves from one another, the following example embodiments are provided:

| Digital Identity #1 | |
|---|---|
| Identity ID | 239847397140983 |
| Name | Jon Doe |
| Email: | jon@example.com |
| Credit Card: | xxxx-xxxx-xxxx-xxxx |
| Apple Pay: | username/password |
| Web History: | site1, site2, site3, etc. |
| Web Data: | Stored cookie data |
| Contacts: | Contacts List |
| Hometown: | Salt Lake City, UT |
| Birthday: | Jan. 1, 1990 |
| Etc . . . | |

| Digital Identity #2 | |
|---|---|
| Identity ID | 438438979871111 |
| Name | Jane Doe |
| Email: | jane@example.com |
| Credit Card: | xxxx-xxxx-xxxx-xxxx |
| Apple Pay: | username/password |
| Web History: | site6, site7, site8, etc. |
| Web Data: | Stored cookie data |
| Contacts: | Contacts List |
| Hometown: | Austin, TX |
| Birthday: | May 1, 1990 |
| Etc . . . | |

| Digital Identity #3 | |
|---|---|
| Identity ID | 341039487139481 |
| Name | Mark Question |
| Email: | mark@example.com |
| Privacy: | Do Not Track |
| Social Media: | username/password |
| Web History: | Blank (erased) |
| Security: | VPN, Tor Network |
| Current City: | Fictitious |
| Education: | PhD |
| Birthday: | Jan. 15, 1989 |

| Digital Identity #4 | |
|---|---|
| Identity ID | 980939937611341 |
| Name | Chris |
| iMessage: | personal_ID |
| Credit Card: | xxxx-xxxx-xxxx-xxxx |
| Other Pay: | username/password |
| Web History: | siteA, siteB, siteC, etc. |
| Browser ID: | Chrome Ver. 60 |
| Device: | Samsung S5 |
| Security: | Allow popups, 3$^{rd}$ party cookies, JavaScript, etc. |

Four sample Digital Identity depictions are provided as example embodiments in order to illustrate the wide range of variations in the composition and data provided for Digital Identities. In each of the four example cases, the field "Identity ID" is common across each. In the standard embodiment, this field is intended to be an internal identifier to distinguish one Digital Identity from another. However, in some usage cases, this value may be collected and used by external processes. If this value is used by external processes, it is highly recommended that it only be with sites with which the user is connected and gives their consent for this value to be used.

Digital Identities #1 and #2 are shown to each have the same structure of data fields that make up the identity. It can also be seen that although the Digital Identity data fields are the same, the content assigned to those fields is distinct for each identity. This type of Digital Identity structure might be simply a coincidence or it might be intentionally structured in order to enable the Digital Identities to be used within the same type of Digital Identity Application.

Digital Identity #3 shows a user that might appear to be more security conscious. In this example, the Digital Identity has privacy settings selected, secure communication options set, has erased the web browsing history, and has set likely fictitious information for their current city, education, and birthday. In other privacy models, simply blocking information (e.g., birthday) may prohibit a user from using an online service. However, by making the information available, it enables the user to operate within the online service, while setting alternative data establishes a different Digital Identity fingerprint and allows the user to operate independently of other Digital Identities (or Legal Identity) they might have, which increases their privacy and inhibits the unauthorized correlation of data collected about the online activities of the real person owner of the Digital Identity.

Digital Identity #4 illustrates a different kind of identity structure and informational content. In this example, the Digital Identity fields show different types of payment and messaging accounts and also provide a number of details regarding the identity's web browser, device hardware, and security settings. While these values are reported, it should be noted that the user has the ability to override the actual values and replace them with values corresponding to their desired tasks. For example, it has been observed that some websites may offer goods or services at a lower or higher cost depending on the type of web browser the user is using. The implication is that users of one type of browser pay less for items while users of another browser often pay more. Setting the dynamic cost of an item based on information collected from the customer does have the effect of maximizing revenues for the vendor, however, it also provides unequal pricing for consumers. By allowing users to override default data (e.g., browser type and version), in this example, users will be enabled to seek the best pricing regardless of what hardware they happen to be using. Overriding default values also enables users to disrupt the collection/correlation of their online fingerprint and thereby increase their online and offline privacy.

An important concept is the notion of bringing a Digital Identity to life through services provided to that Digital Identity. For example, if the Digital Identity is provisioned with an email address, and can communicate using that email address, then the Digital Identity has begun to have a life of its own separate from the Legal Identity of the user.

FIG. 1 illustrates a digital identity application 100, which includes an application user interface 102, digital identity application API 104 and digital identity client service kits 106. The digital identity application 100 accesses a digital identity management system 108 with digital identity services 110, which support different digital identities 112_1 through 112_N.

Digital Identity services 110 are provided via Digital Identity Applications (DIAs) 100. These applications (mobile, desktop, web) leverage the services provided by the Digital Identity Management System (DIMS) 108. To allow optimum maintenance, reuse and testing of code, the Digital Identity Applications leverage a well-defined Digital Identity Application (DIA) API 104. This API is a set of subroutine definitions, protocols, and tools for building the Digital Identity Applications. Because the Digital Identity API has a well-defined interface, Digital Identity Applications 100 can communicate with any Digital Identity Management System 108 that conforms to the interface standard, and vice versa. The whole system including the Digital Identity Application 100 and the Digital Identity Management System 108 is termed the Digital Identity Application Management System.

The Digital Identity Application API 104 itself is built from a number of Digital Identity Service Kits (DISKs) 106 to have access to services provided by the Digital Identity Management System 108. The Digital Identity Service Kits 106 are each built around specific types of function e.g. digital identity management, email, voice calling, browsing, payments, reputation, marketplace and so on. Core data structures and functionality are abstracted into these kits.

Figure 2:
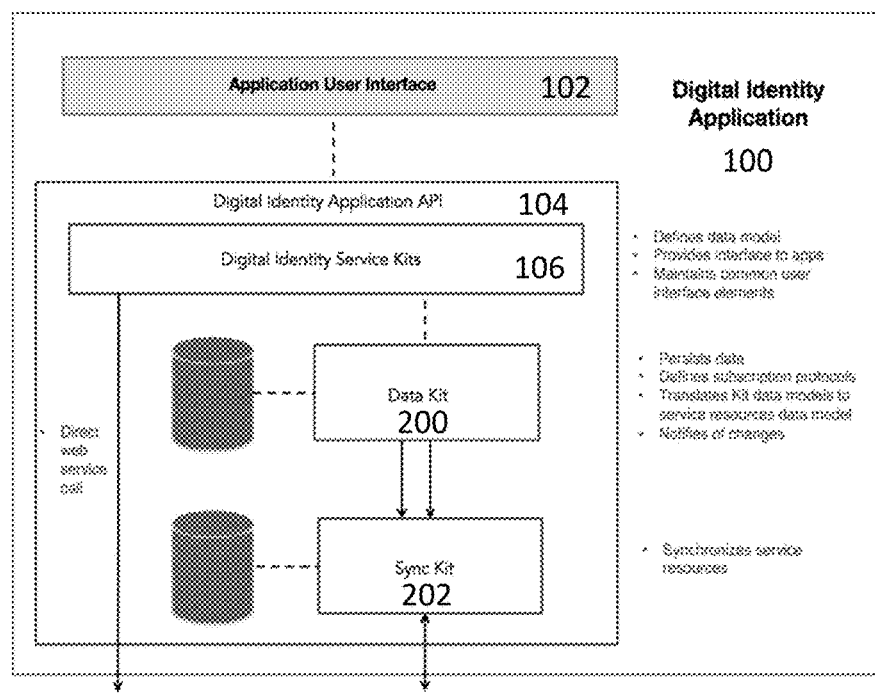
FIG. 2 illustrates different kits utilized in accordance with an embodiment of the invention.

FIG. 2 illustrates a digital identity application 100 with a data kit 200 and sync kit 202. The digital identity service kits define a data model, provide interfaces to applications and maintain common user interface elements. Data kit 200 persists data, defines subscription protocols, translates kit data models to a service resources data model and notifies changes. The sync kit 202 provides synchronization service resources to external data processing and storage entities (e.g., network-connected server providers, peer-to-peer infrastructure, or non-networked connection to other computing hardware or process, etc.).

The Sync Kit 202 is created generically and can be used by all of the Digital Identity Service Kits. However, each Digital Identity Service Kit will have its own data model and functionality, each separately leveraging the Data Kit 200. The role of the Sync Kit 202 is to synchronize up/down resources from the Digital Identity Management System 108. It stores the resources in a very generic way. The Sync Kit 202 does not know about any other Kit. The Data Kit 200 will access it directly to save (synchronize) changes. All changes from the Sync Kit 202 will be passed to the Data Kit 200 through a subscriber protocol. There may also be a direct path from a Kit to the Digital Identity Management System 108 for functions that require a direct request/response and are not suitable for the synchronization layer. An example would be to request the list of available email domains.

Figure 3:
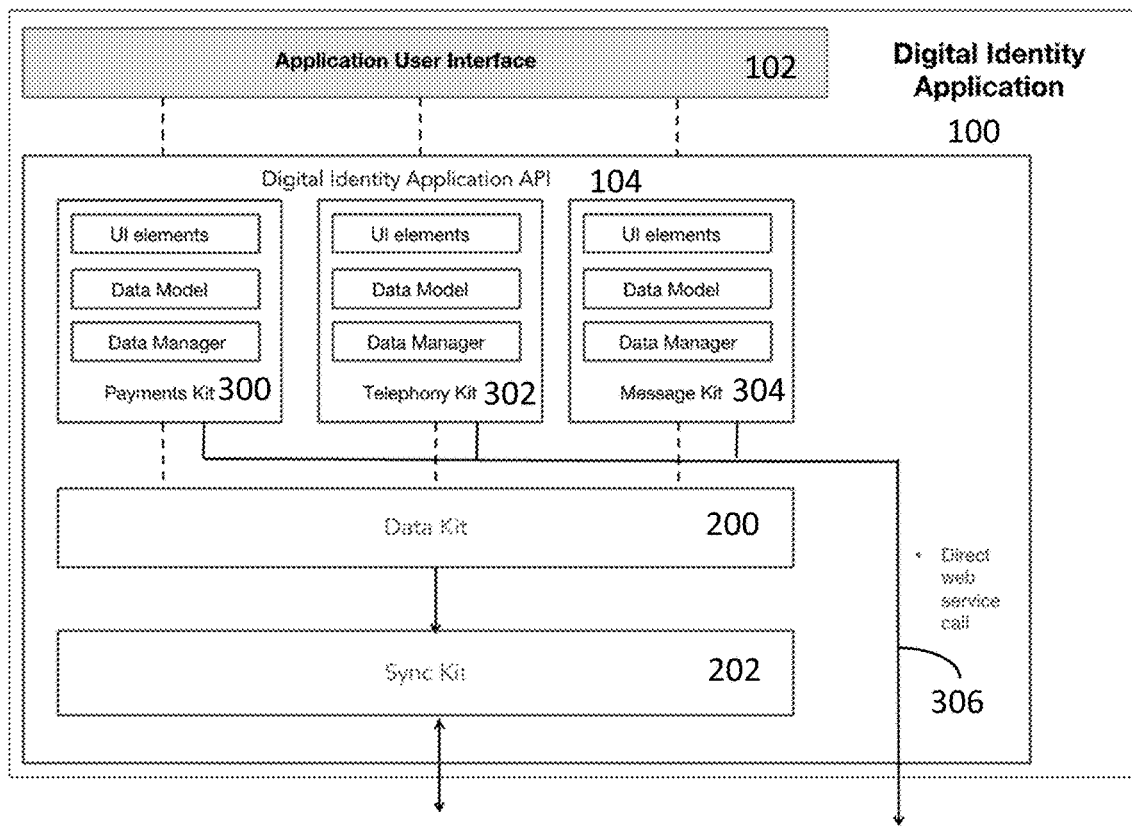
FIG. 3 illustrates different kits utilized in accordance with an embodiment of the invention.

FIG. 3 illustrates a digital identity application API 104 supporting a payments kit 300, telephone kit 302 and message kit 304. In this embodiment, each kit includes user interface elements, a data model and a data manager. The data manager leverages the Data Kit 200. Each Kit can make direct calls to the Digital Identity Management System, as shown with arrow 306.

In the most basic sense, a Digital Identity is a collection of data and optionally a collection of operating routines to manage that data. As was described above, separate applications may be created to use, leverage, and interact with Digital Identities. The following sections provide an overview of how $3^{rd}$ Party Applications are created, distributed, and used within the Digital Identity Application Management System 108.

The Digital Identity Application Management System 108 establishes a platform whereby applications, within certain prescribed rules and guidelines, may connect to Digital Identities and to the Digital Identity Management System in order to utilize the data contained (or referenced) therein. Such applications, when not created by the Digital Identity Application Management System owner/operator, are referred to as $3^{rd}$ Party Applications (e.g., "$3^{rd}$ Party Apps").

Figure 4:
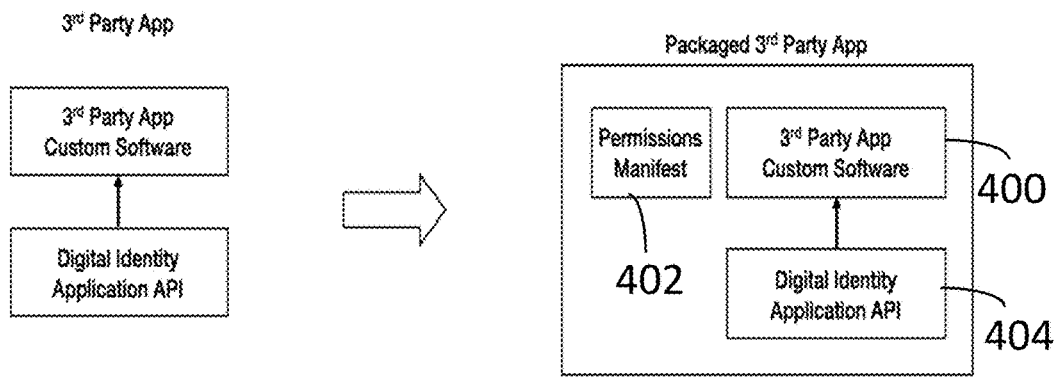
FIG. 4 illustrates a third-party application creation process utilized in accordance with an embodiment of the invention.

In order to create a $3^{rd}$ Party App, a $3^{rd}$ Party App Developer must obtain and utilize the Digital Identity Application API which specifies how $3^{rd}$ Party Apps can authenticate themselves, access/update/add/remove data within a Digital Identity, and perform a wide range of approved actions related to a Digital Identity. Once a $3^{rd}$ Party App is created in accordance with the Digital Identity Application API, it is packaged together with a Permissions Manifest that (among other disclosures and specifications) discloses the data items controlled by the Digital Identity and how they will be used. This allows a Digital Identity owner to make the determination of whether to allow a $3^{rd}$ Party App to operate on their Digital Identity. A high level view of this relationship is depicted in FIG. 4. $3^{rd}$ Party App Custom Software 400 has an associated permissions manifest 402. The $3^{rd}$ Party App Custom Software 400 complies a digital Identity Application API 404.

For $3^{rd}$ party apps that will access a Digital Identity's content, it is necessary to allow such access only in accordance with a Digital Identity's owner's informed consent. To allow a Digital Identity user to consent (or not), it is necessary for a $3^{rd}$ Party App to disclose the specific data elements (through the Permissions Manifest) it intends to access within a Digital Identity. The user determines whether the $3^{rd}$ Party App has been validated and authorized by the Digital Identity Application Management System.

In order to reasonably demonstrate authenticity and compliance to the user, the $3^{rd}$ Party App Developer must undergo validation testing and receive a digital signature, both of which will be performed by the Digital Identity Application Validation and Signing Server (DIAVSS) (i.e., Validation Server; a sub-component or companion component of the Digital Identity Application Management System 108).

To be validated and signed, a $3^{rd}$ Party App Developer submits the $3^{rd}$ Party App to the Validation Server for testing and certification. The Validation Server will put the $3^{rd}$ Party App through a series of verification and validation steps to ensure that the $3^{rd}$ Party App is performing as disclosed, is operating in accordance with the Digital Identity API, and is not performing hostile actions.

Figure 5:
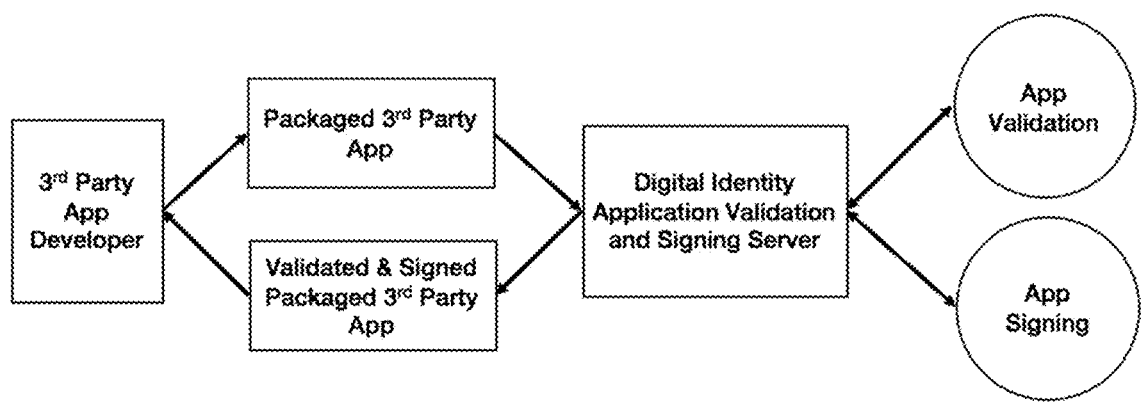
FIG. 5 illustrates testing and signing of third-party applications in accordance with an embodiment of the invention.

Once the testing of the $3^{rd}$ Party App passes the verification and validation tests, the Validation Server cryptographically digitally signs the app using a user-verifiable signing process (e.g., SHA-256 with a Hashed Message Authentication Code). Optionally, and in addition to being cryptographically signed, the $3^{rd}$ Party App may also be encrypted. If this encryption step is used, the $3^{rd}$ Party App may be encrypted using the main public/private key of the Validation Server or it may be encrypted upon download request using the public key of the user requesting the download. The resulting signature is linked or attached to the (optionally encrypted) $3^{rd}$ Party App and the resulting package is returned to the $3^{rd}$ Party App Developer, which is shown in FIG. 5. Upon completion of the validation and signing processes, the Validation Server stores a transaction record of the $3^{rd}$ Party App, the resulting digital signature, a validation status, and other information necessary to later verify the validation process.

Figure 6:
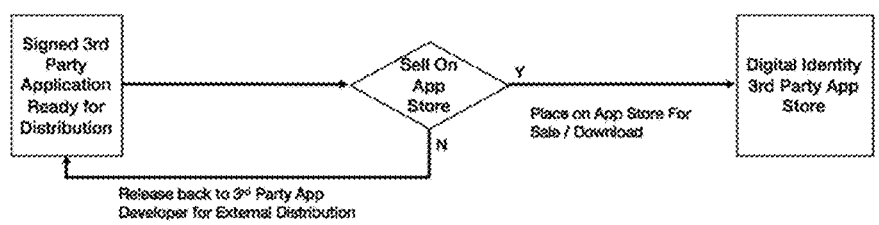
FIG. 6 illustrates application distribution processing performed in accordance with an embodiment of the invention.

In addition to returning the signed $3^{rd}$ Party App directly back to the $3^{rd}$ Party App Developer, the signed app may also be placed on the Digital Identity $3^{rd}$ Party Online App Store where it can be made available for download from a central location. Placing the app in a central location carries the benefit that the Digital Identity $3^{rd}$ Party Online App Store is known and trusted by users of the Digital Identity system. FIG. 6 shows an overview of this process.

In order to achieve the widest distribution of 3rd Party Apps, multiple distribution mechanisms or models may be used. Such mechanisms include (but are not limited to):

1) Direct Distribution (e.g., an 'Online App Store'): an Online App Store selling mechanism operated by or in conjunction with the Digital Identity Application Management System 108.
2) Independent Download Site: an independent download site could be a 3rd Party Developer placing their approved (and officially signed) app on their own website for download. An independent download website could also include a large website offering numerous different applications for download (e.g., Apple's App Store, CNet.com, etc.).
3) Shared from Person-to-Person: in this scenario, an officially signed $3^{rd}$ Party App could be more directly copied from one user to another. Such a transfer may take place over a close proximity link (e.g., Bluetooth, Near Field Communications, etc.) or via an intermediary storage mechanism (e.g., a user's internet storage space, email, message, etc.).

Regardless of the distribution method, it is important for users to be able to verify that the $3^{rd}$ Party App is:

1) Compliant: the app is compliant with all Digital Identity Application Management System standards and guidelines.
2) Unaltered: the app has not been modified after it was released for distribution by the 3rd Party App Developer.

As described previously, compliance with the Digital Identity Application Management System standards and guidelines is determined by the $3^{rd}$ Party App Developer submitting an app to the Digital Identity Application Validation and Signing Server for evaluation. If the $3^{rd}$ Party App passes the validation testing process, it is signed by the Digital Identity Application Management System's $3^{rd}$ Party Application Signing Key.

Each officially validated $3^{rd}$ Party App will have been signed by the Digital Identity Application Management System's official signing key. This process enables a user to verify that the $3^{rd}$ Party App has passed the validation process and remains unmodified. In order to validate the $3^{rd}$ Party App's distribution signature, a secure signature validation process is required. Without a secure signature validation process, it will not be clear whether the $3^{rd}$ Party App is authentic or if it has been modified by a subversive or other process.

Prior to securely downloading $3^{rd}$ Party Apps, a Digital Identity Management Application must first be downloaded from the Digital Identity Application Management System. The Digital Identity Management Application is the core application that will enable users to create and manage their own Digital Identities. Additionally, the Digital Identity Management Application contains routines and credentials to securely connect to the Digital Identity Management System and verify the authenticity of any $3^{rd}$ Party App that is downloaded. In alternate embodiments, these functions (rather than requiring a separate Digital Identity Management Application) may be included in the Digital Identity Application API, which would cause them to be included in a $3^{rd}$ Party App and presented to the user from those apps.

In those alternate embodiments, a separate Digital Identity Management Application may not be required.

When downloading any $3^{rd}$ Party App it is important to properly authenticate it in order to ensure that it has not been tampered with. When $3^{rd}$ Party Apps are downloaded directly from the Digital Identity $3^{rd}$ Party Online App Store, the $3^{rd}$ Party App Application process described below is used to verify that the $3^{rd}$ Party App has not been modified and that the signature has not been revoked.

Among other potential elements, the digital signature will contain an encrypted hash of the $3^{rd}$ Party App and the Public Key corresponding to the Private Key used to encrypt the original hash. The following steps are an embodiment of a $3^{rd}$ Party App authentication process.

1) Securely download $3^{rd}$ Party App from the Digital Identity $3^{rd}$ Party Online App Store (or, optionally, from other trusted download site)
2) From the $3^{rd}$ Party App, extract the digital signature (previously created with the Validation Server using its Private Key)
3) Extract the Validation Server's Public Key from the digital signature
4) Decrypt the digital signature's original hash using the Public Key
5) Hash the $3^{rd}$ Party App using the algorithm specified by the digital signature
6) Compare he original (decrypted) hash to the newly computed hash
7) If the hashes match, then the $3^{rd}$ Party App validates as unmodified
8) Verify (with the Validation Server) that this signature/key has not been revoked.

(Alternatively, this step may be performed at any point in the $3^{rd}$ Party App Verification Process.)

The process described above is often performed by the host operating system, a trusted download manager, or by the trusted download site. When $3^{rd}$ Party Applications are downloaded from other sources (e.g., developer's website, shared from a friend, etc.), the app's integrity must be verified via an expanded process. This is due to the fact that the integrity of an app cannot be verified using the app itself (which may have been tampered with), unless it has directly come from a known good location.

When a $3^{rd}$ Party App is acquired from an unknown source, it is unknown whether the app has been tampered with. Some examples of tampering include malicious hackers manipulating the binary app. Other examples can be less nefarious and include a host download site embedding the applications they download with other applications, such as: advertising apps, virus scanner trials, browser toolbar plugins, alternative browser search settings, etc.

In instances where a $3^{rd}$ Party App is acquired from an unknown (or not trusted) source, it must be validated using a trusted verification tool before it is allowed to access the Digital Identity contents. This verification tool can take many alternative embodiments, including: a separate tool downloaded from the Digital Identity Management System or official App Store, a validated connection to the Digital Identity Management System, run as part of a locally-installed Digital Identity access mechanism, etc.

From time to time, it may be desirable to invalidate (revoke) a $3^{rd}$ Party App's validation signature. Since the validation and signature transaction records will have been logged/stored with and by the Digital Identity Application Validation and Signing Server (DIAVSS), revoking a $3^{rd}$ Party App's validation status will amount to clearing a validity flag stored within a particular $3^{rd}$ Party App's entry (on the DIAVSS), thus marking its validity status as invalid. By clearing the validity flag, future validity requests coming to the DIAVSS will result in an invalid status being returned. The process of invalidating validity status settings can be performed by either the 3$^{rd}$ Party App Developer or the administrator of the Digital Identity Application Validation and Signing Server (or an official DIAVSS designee).

When 3$^{rd}$ Party Apps are created, a Permissions Manifest is specified as part of the Packaged 3$^{rd}$ Party App specification. In one embodiment, either all stated permissions shall be accepted by the installing user or the app will not install. In another embodiment, the user may select which of the requested data access permissions shall be honored (i.e., the corresponding data being accessible to the 3$^{rd}$ Party App) with the remaining data elements being inaccessible to the 3$^{rd}$ Party App. In this embodiment, the 3$^{rd}$ Party App is constrained by the Digital Identity API, which enforces access control to the Digital Identity's data elements according to the Permissions Manifest accepted by the user. Enforcing which data items are accessible will result in some data items being accessible (e.g., for read, write, and/or update access), while others are kept as inaccessible to the 3$^{rd}$ Party App. The 3$^{rd}$ Party App handles the user interface and user experience ramifications of approved or denied access.

Below is an example of how a Permissions Manifest may be presented to the user along with annotations depicting the specific data items being requested for access. The user may leave the requested information items as 'checked' to allow them to be accessible to the 3$^{rd}$ Party App or uncheck them to block them from being accessible by the 3$^{rd}$ Party App.

| Permissions Manifest | |
| --- | --- |
| Approve | Description |
| [x] | First Name |
| [x] | Last Name |
| [x] | Email Address |
| [ ] | Phone Number |
| [ ] | Street Address |
| [ ] | City |
| [ ] | State |
| [ ] | Zip Code |
| [x] | Country |
| [x] | E-Commerce Site Login Credentials |
| [x] | Social Media Site #1 Credentials |
| [ ] | Social Media Site #2 Credentials |
| [x] | Email Service Credentials |
| [x] | Credit Card Number And Data |
| [x] | Cloud Storage Credentials |
| [ ] | |
| [ ] | |
| [ ] | |
| [ ] | |
| [ ] | |

A Local Digital Identity Architecture (LDIA) consists of all of the data and operating methods necessary to support Digital Identity operations on a local device. The functionality described by this architecture controls all of the Digital Identities or Digital Identity information that a user may create, store on a local device, or transfer between devices. It also manages all interactions with external applications or platforms, such as:

Digital Identity Management System (centrally-hosted on and accessed via the internet)
Official Digital Identity Apps installed on the local device
Locally-Installed 3$^{rd}$ Party Apps
Internet-Based 3$^{rd}$ Party Apps
Local Independent Applications (e.g., web browsers, email readers, notes, etc.)
Peer-to-Peer Interactions (to communicate Digital Identity information or commands between user devices)

Some LDIA components may be installed before any Digital Identity operations begin on the local device. Additional LDIA components may be installed subsequent to the initial installation. Still other LDIA components may be presented from websites that direct users to install the LDIA system and/or enable them to do so. In one embodiment, the latter could be manifested as a Digital Identity-related component hosted on a web page that when launched or clicked results in locally-installed Digital Identity components responding or taking an action. In another embodiment, the Digital Identity-related component hosted on a web page that when launched or clicked gives the user the option to install Digital Identity components not previously installed (e.g., web link that navigates a browser user to a download site to install the Digital Identity software).

The LDIA also may be updated from time to time. Some of these updates include system updates that fix, patch, augment, remove, etc. the local operating methods. Other updates include adding, deleting, or modifying any locally-installed Digital Identity Apps or information that are stored by the Digital Identity Management System. These apps may include internal apps necessary to operate the LSIA that the user may not explicitly interact with or they may include featured applications presented for the user to interact with directly.

Figure 7:
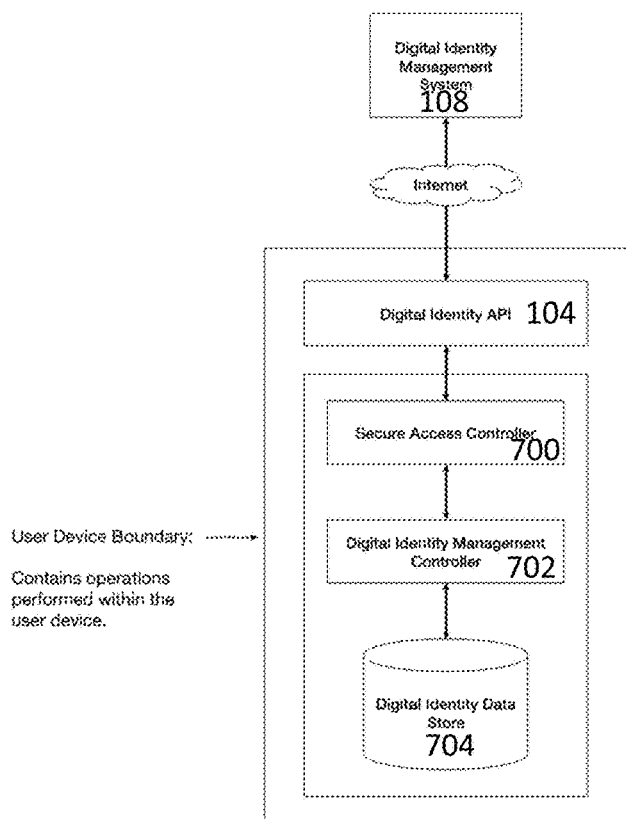
FIG. 7 illustrates a Local Digital Identity Architecture (LDIA) component operating within a user device.

FIG. 7 shows the main LDIA components that operate inside of a user's device (e.g., phone, tablet, laptop, IoT device, watch, etc.) and that they will connect to the DIMS server platform via the Internet. These components include a secure access controller 700, digital identity management controller 702 and a digital identity data store 704.

Figure 8:
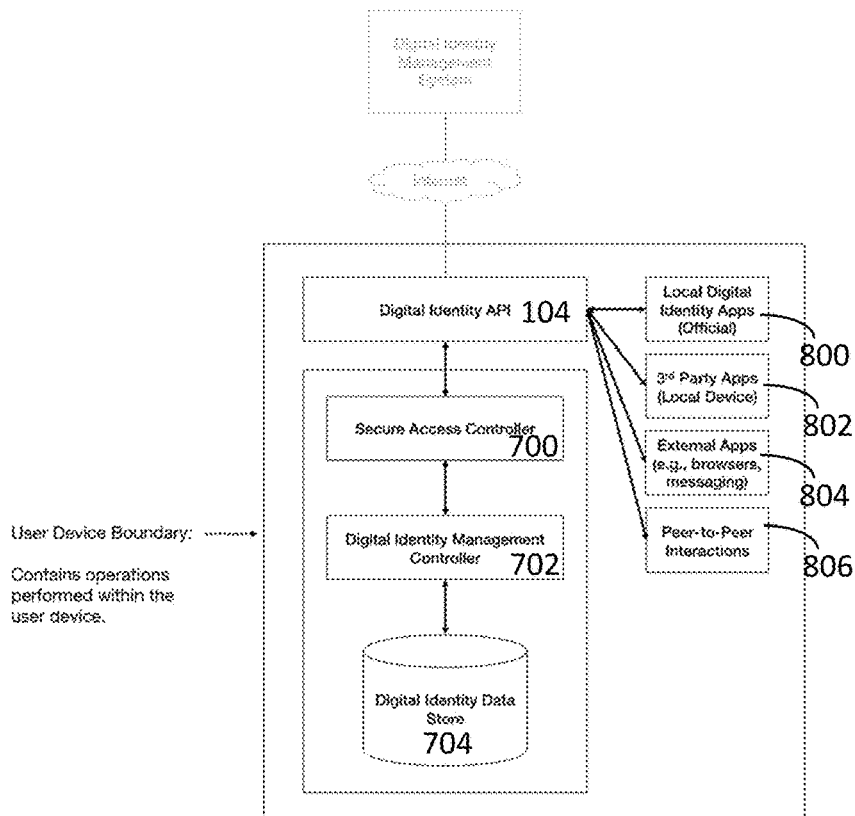
FIG. 8 illustrates LDIA components performing on-device interactions.

In FIG. 8, it is shown how additional components may operate within the user's device and communicate with the LDIA components. Such additional on-device components include: officially-produced Local Digital Identity Apps 800, 3$^{rd}$ Party Apps 802, External Apps (e.g., browsers, email, etc.) 804, as well as, components for Peer-to-Peer (P2P) interactions 806. It should be appreciated that some 3$^{rd}$ Party Apps may be hosted on the Internet or communicate via the Internet with a device's LDIA infrastructure.

Figure 9:
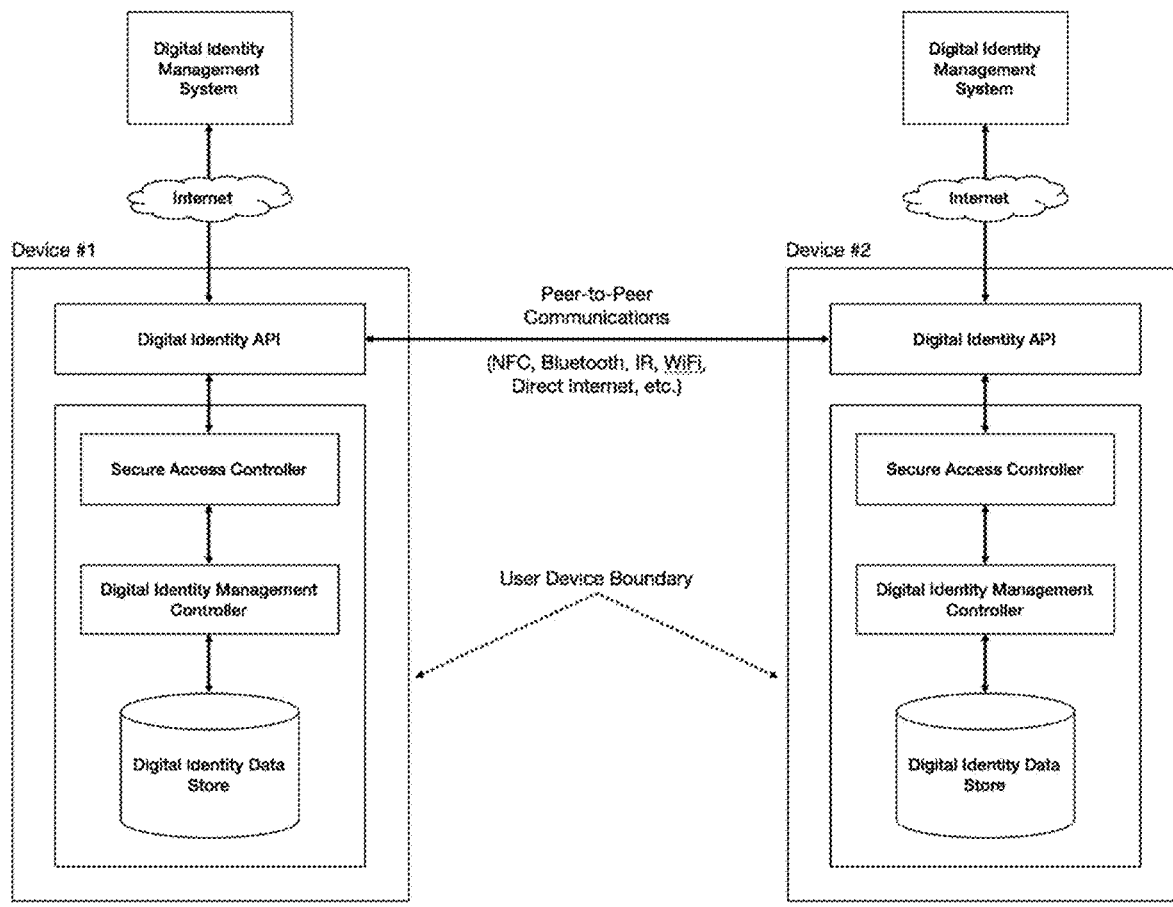
FIG. 9 illustrates LDIA peer-to-peer communications.

FIG. 9 shows two user devices (each supporting their LDIA environments) can communicate via P2P mechanisms. P2P mechanisms may include any path that P2P can operate over and include (but are not limited to): Near Field Communication (NFC), Bluetooth, Infra-Red, WiFi, direct 'serverless' internet connectivity, etc.

The Digital Identity Management System (DIMS) 108 and its operations have been described previously. DIMS is not strictly a part of the LDIA, since it's not 'local'. However, it is an integral component to the overall LDIA operations. DIMS provides secure coordination and communication for a Digital Identity user's account and their various devices. It interfaces with and coordinates any external accounting services that operate within the overall Digital Identity system. Such services can include linking external payment systems (e.g., bank account, Apple Pay, etc.), communication systems (e.g., email), etc. As these services are integrated at a system level, a corresponding user interface is presented to the users so that they may control the user-level interactions with those systems.

Local Digital Identity Apps (Official) are locally-installed Digital Identity Apps that are part of the official distribution of Digital Identity systems. They may be installed from time-to-time either as part of the core installation or subsequently in response to user selections. These official apps may include operating and management functions provided by the Digital Identity Management System that are necessary to support the function and operation of Digital Identities or they may include optional apps made available to enhance a user's experience and activities.

3$^{rd}$ Party Apps (Local or Internet-Based) are applications that have been developed by 3$^{rd}$ Party Developers in compliance with the APIs, rules, and guidelines provided by the Digital Identity Management System's operator. Within the authorized scope, these 3$^{rd}$ Party Apps may augment and extend existing Digital Identity functionality, as well as, introduce new and unforeseen functionality for users to use. 3$^{rd}$ Party Apps will all undergo a verification and validation process to ensure that they are in compliance with the API rules and guidelines, to digitally-signed the 3$^{rd}$ Party Apps upon successful validation, and a verification mechanism (e.g., app or function within a larger app) for users to verify an app's authenticity.

The LDIA system may communicate with external on-device applications (External Apps). Such applications may include: web browsers, email clients, messaging clients, word processing, multi-media apps, etc.

The LDIA components may communicate with other user devices or even devices from other users via Peer-to-Peer (P2P) Interactions. Such P2P communication paths may include: NFC, Bluetooth, WiFi, Infra-Red, direct 'serverless' Internet communications, etc.

The Digital Identity API provides a set of routines that allow developers to create new and pluggable (i.e., interoperable) functionality that can be distributed to Digital Identity users. Example API functionality may contain (but is not limited to): access control methods to allow/block access by external apps, to enable apps to read/write/update/delete Digital Identity information, to create/delete/modify Digital Identities, or to import/export Digital Identities or their information. The API (or a portion thereof) may be made available to developers working internally to the Digital Identity Management System's sponsor. The API (or a portion thereof) may also be made available to 3$^{rd}$ Party Developers. Developers working internally to the Digital Identity Management System's sponsor may have access to additional or enhanced API's compared to those made available to external 3$^{rd}$ Party App Developers.

The Secure Access Controller 700 contains the collection of internal routines necessary to authenticate access requests from applications seeking to access the Digital Identity information. It performs the necessary cryptographic functions required for access control operations. This controller (via the API) will also communicate with the Digital Identity Management System 108 to perform secure data transmission functions. In one embodiment, these functions enable the information stored within the Digital Identity Data Store 704 to be synchronized with the Digital Identity Management System's server and secure storage platforms. This secure (encrypted) remote synchronization facilitates the secure synchronization of Digital Identity information with additional user devices that have received the necessary access tokens and/or cryptographic access material.

The Digital Identity Management Controller 702 performs database operations necessary to securely create, delete, update, copy, manage, etc. any Digital Identity, Digital Identity information, or perform other administrative operations. This functionality includes the necessary functionality to encrypt or decrypt the database, as well as, the ability to manage access control tokens such as passwords, certificates, cryptographic keys, etc.

The Digital Identity Data Store 704 is the actual database used to store encrypted Digital Identity information. This data store performs standard secure (encrypted) database functions.

The Digital Identity Service Kits (i.e., 'Kits') are divided on functional areas that are used in the Digital Identity Applications. Each kit introduces and provides digital identity functions to be commonly used across all Digital Identity Management infrastructure or 3$^{rd}$ Party Apps. A kit includes functionality such as payments, browser, calling, email, etc. All data structures and functionality are abstracted into these kits and can optionally be made accessible to 3$^{rd}$ Party Apps via the Digital Identity Application API. While not limited to the kits listed below, this list provides one embodiment of commonly used Kits.

| Kit Name | Responsibilities |
| --- | --- |
| KeyManagerKit | Cryptography used in registering, authenticating, encrypting. |
| ManagementKit | Create, edit, delete and fit out Digital Identities. |
| AccountKit | Account registration, Capabilities, Account Info, Entitlements, In-App Purchases, Backup/restore |
| PaymentsKit | Provisioning of Virtual Cards, List of transactions |
| NotificationsKit | Provide tools for handing Notifications across email, messaging, voice events. |
| BrowserKit | Browser functionality and activity management. |
| EmailKit | Provide new email addresses. Also, functionality for emailing in and out of network. |
| MessagesKit | Functionality for messaging in and out of network. |
| ContactsKit | Contact management for each digital identity, and for device. |
| AnalyticsKit | Exposes methods for registering events on apps. |
| VoiceKit | All functionality for placing and receiving a call. |
| TelephonyKit | Functionality for managing phone numbers |
| ReputationKit | Functionality for viewing and updating reputation |
| MarketplaceKit | Selling, trading, auctioning of Digital Identity |

A Key Management Kit's purpose is to support all cryptographic operations required by the applications. This includes operations to securely perform cryptographic operations such as the following:

Public Key Management: generate, store, retrieve, exchange, expire, destroy, etc. public key pairs Symmetric Key Management: generate, store, retrieve, exchange, expire, destroy, etc. symmetric keys Certificate Management: generate, store, retrieve, exchange, destroy, import, export, authenticate, etc. digital certificates Key Exchange: control the key exchange processes according to secure key exchange processes and mechanisms Key Storage: encrypt keys for secure storage, as well as, decrypting keys for use. Optionally, may use the secure key storage mechanisms provided by the host operating system or even another kit.

Zeroization: securely erase keys, data, algorithm instantiations, etc. when no longer needed. This can be done on a permanent or per-use basis.

Cryptographic Operations: securely perform encryption, decrypting, signature verification, signature generation, etc. according to the necessary security standards and guidelines Comply with required industry, government, or user-selected security standards. One example of US Government security standards is the FIPS-140 series.

Authentication to the Digital Identity Management System

Encryption and decryption of Digital Identity data

The Management Kit controls and coordinates all management activities related to Digital Identities. It also provides API functions to other Kits and allows them to create, update, and delete Digital Identities. Management Kit also implements (internally) the necessary sub-actions for each external action. For example, Management Kit maintains the encrypted Digital Identity databases, as well as, all interactions (e.g., store, retrieve, delete, modify, etc.) with those databases. Most other Kits will connect with the Management Kit in order to access Digital Identity-related information.

Figure 10:
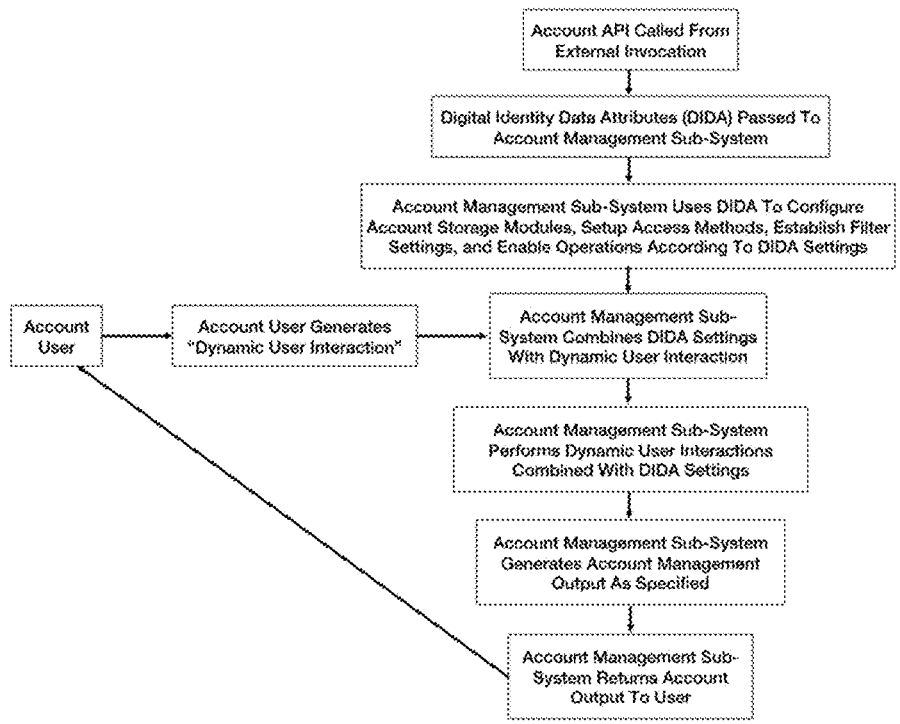
FIG. 10 illustrates account API functions performed in accordance with an embodiment of the invention.

Account Kit manages the external accounts that a user creates or registers, as well as, any costs associated with those accounts. For example, some types of phone calling accounts may incur a fee and Account Kit coordinates remitting any payments (with Payments Kit) that are required for the account and logs all transactions. Account Kit also coordinates any account notifications, account settings, fees, etc. FIG. 10 illustrates processing operations associated with an embodiment of the Account Kit. For system integration purposes, Account Kit provides an API with a set of process functions that manage account access functions, account data storage, and data manipulation for Digital Identities.

The Payments Kit provides functions for performing payment operations, such as the following:

Perform payment authorization actions

Remit payments (e.g., send a payment)

Perform purchase transactions

Cancel purchase transactions (when possible)

Receive payments (e.g., receive a payment)

Generate new financial instruments (e.g., creating new virtual credit cards)

Cancel/delete financial instruments

Record payment transactions (e.g., deposit, withdrawal, payment, etc.)

Query/sort/manage payment transactions

Query/sort/manage financial instruments

Import/Export financial transaction data to other programs

Figure 11:
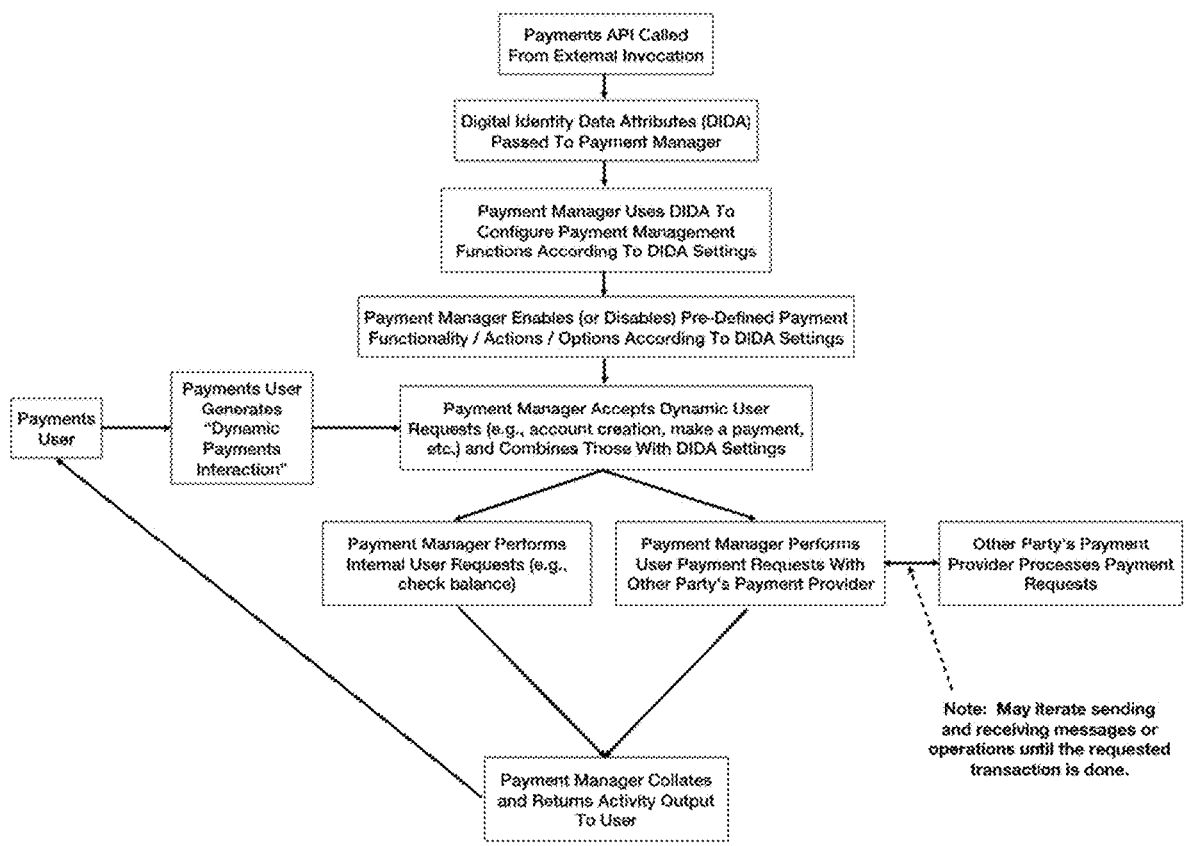
FIG. 11 illustrates pay management functions performed in accordance with an embodiment of the invention.

The Payments Kit provides an API to enable other Kits or applications to authorize or query financial transactions. FIG. 11 illustrates processing flow associated with an embodiment of a Payments Kit.

The Notifications Kit controls all incoming notifications and their dissemination throughout the Digital Identity App. Notifications may come from the host operating system or they may come from communications channels setup by the Digital Identity App instantiating the Notifications Kit. In one embodiment, the Digital Identity App may receive an incoming notice that an email is available for one of the Digital Identity user's email accounts. In this instance, the Notifications Kit presents a visual notification alert to inform the user that an email has arrived. In another embodiment, an incoming phone call is detected and one or more alerts (e.g., audible, visual, or physical such as a vibration) is presented to the Digital Identity user.

Figure 12:
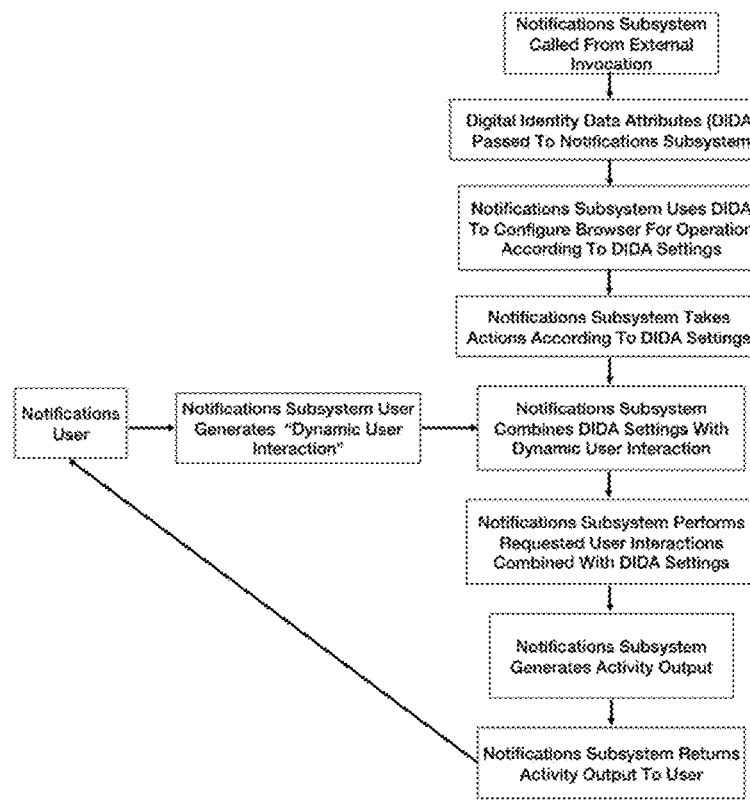
FIG. 12 illustrates notification operations performed in accordance with an embodiment of the invention.

Incoming notifications may take on numerous forms that are dependent upon the type of subscribed service receiving the notification. Some notifications are communication-related (e.g., email, phone call), they may also be payments-related (e.g., incoming payment or billing), etc. In other embodiments, notifications may also be related to system operations, such as a phone losing its internet connection or being out of memory. There are numerous types of notifications that may arrive to be presented to the user. The purpose of the Notifications Kit is to receive incoming notifications, disseminate them throughout the Digital Identity App, and then to correlate any user response (e.g., dismissing the notification alert, or opening the alert in order to perform actions corresponding to the received notification). FIG. 12 illustrates processing operations associated with an embodiment of the Notifications Kit.

The Browser Kit (API and Process Functions) provides a web browser function to enable a user to interact with remote internet sites, network sites, and even locally-stored web data. This kit allows the user to use different tabs to rapidly switch between different web pages. The Browser Kit manages the storage and retrieval of bookmarked data (e.g., favorites, bookmarks), history, cache storage of web data, etc. in order to manage a user's web browsing experience. Web page data may also be saved outside of the browser, retrieved from storage locations, shared with other users, printed, or transferred into other programs. Users may visit websites by typing in web addresses (e.g., URLs) or clicking/launching hyperlinks to visit new websites.

Additions or plugins may be connected to the Browser Kit in order to further augment the browsing experience. Such plugins may enable new data types (e.g., video, audio, virtual reality, etc.) to be launched, viewed, or manipulated.

An auto-fill function is also provided in order that data that a user enters into web pages is stored securely within the Digital Identity's context so that it may be automatically retrieved and automatically re-entered into the same or similar web pages and or web page input fields when the browser encounters such pages or fields in the future. This auto-fill information is stored securely (e.g., encrypted) in order to protect the Digital Identity user's privacy.

Figure 13:
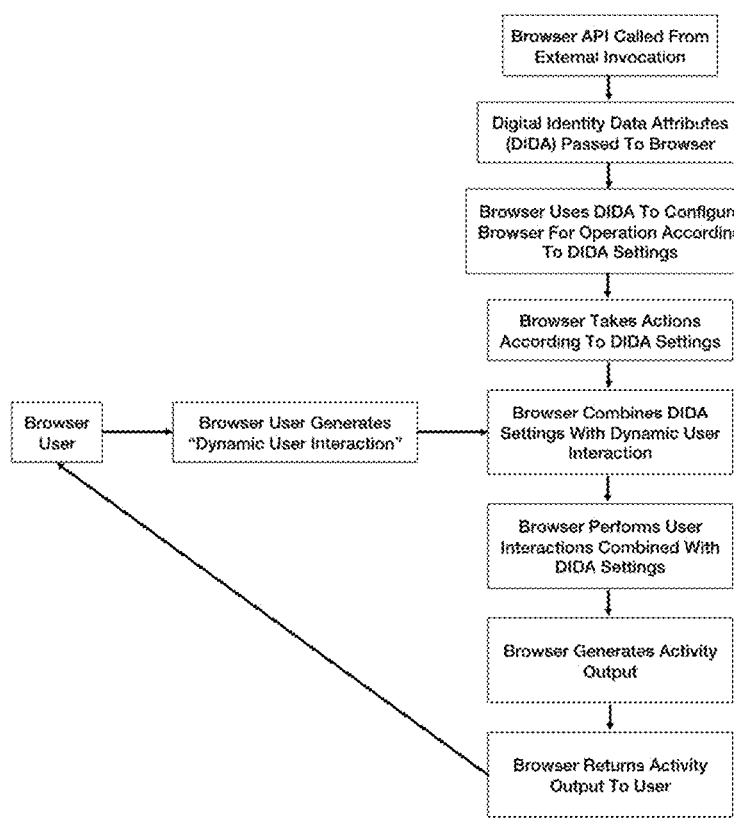
FIG. 13 illustrates browser functions performed in accordance with an embodiment of the invention.

FIG. 13 describes how Digital Identity configurations are passed into a browsing system, setup the initial operation of the browsing system, interoperate with dynamic user interactions, and generate output activity to be presented to or otherwise used by the Digital Identity user.

Each Digital Identity maintains a web browsing experience and operating environment that is separate from that of all other Digital Identities. This includes any type of operating information, such as configuration data, auto-fill data, cache data, etc. In addition to operating information, the Browser Kit may also securely store (e.g., encrypted) user authentication data, such as: username/password combinations, account creation/maintenance information, account web site designations, etc.

Periodically, users may elect to change the currently selected Digital Identity that is used to configure and operate within the Browser Kit. When the Browser Kit receives a notification that the Digital Identity Data Element (DIDA) has been changed, the Browser Kit securely stores any necessary information (e.g., such as operating information and user authentication data), securely erases the necessary information from active memory, and then opens the necessary information for the newly-selected Digital Identity and presents a new Browsing environment with the new information.

Figure 14:
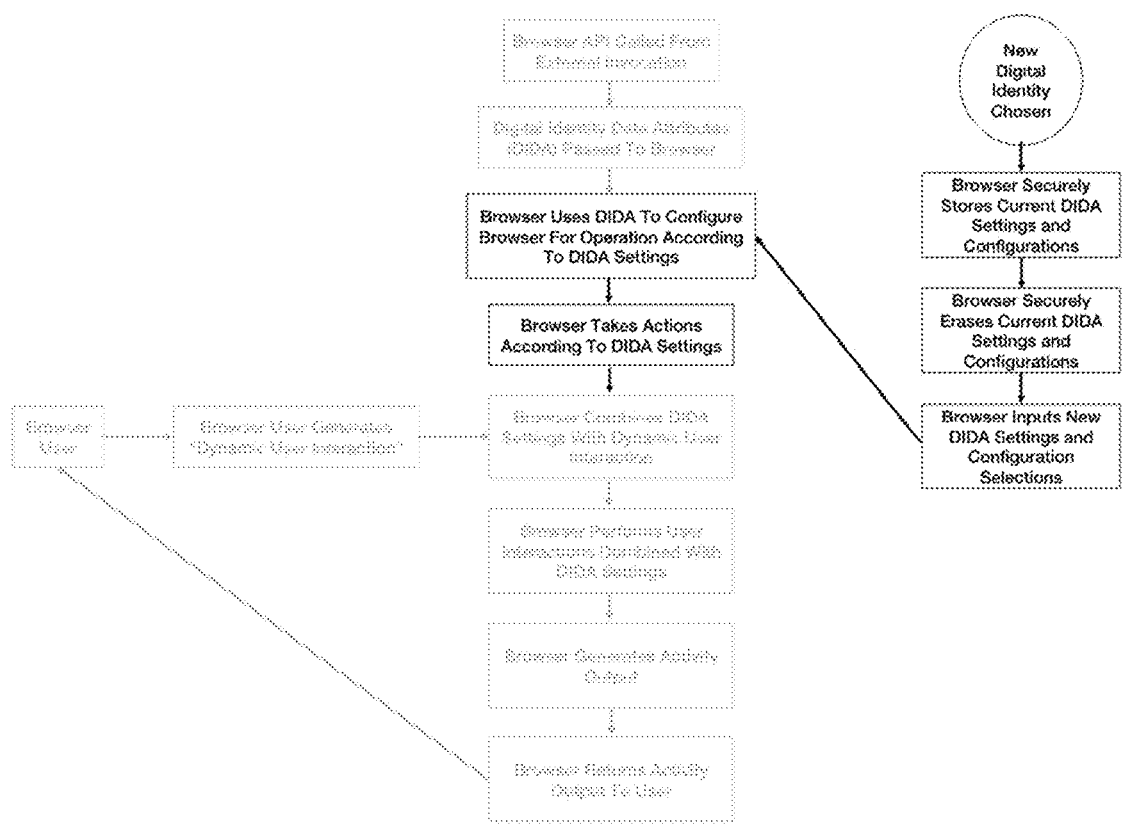
FIG. 14 illustrates browser kit internal functions performed in accordance with an embodiment of the invention.

FIG. 14 characterizes the Browser Kit's internal operations and functionality with regards to changing Digital Identities during current or subsequent operation.

The Activities Kit is a new type of web browsing support tool. As such, it works closely with the Browser Kit. Activity Kit's purpose is twofold: automating a website's account creation process and also automatically logging a user into a website on subsequent visits.

Activity Kit simplifies the account creation process by walking a user through a website's account creation process. It does this either by guiding them through the custom account creation web pages presented by the host website or optionally by presenting all of the necessary account creation data input fields in a concise format within a single page. The single account creation page presentation is more concise for users, however, the host website may not allow such a custom presentation, so the guided navigation approach may also be used.

Figure 15:
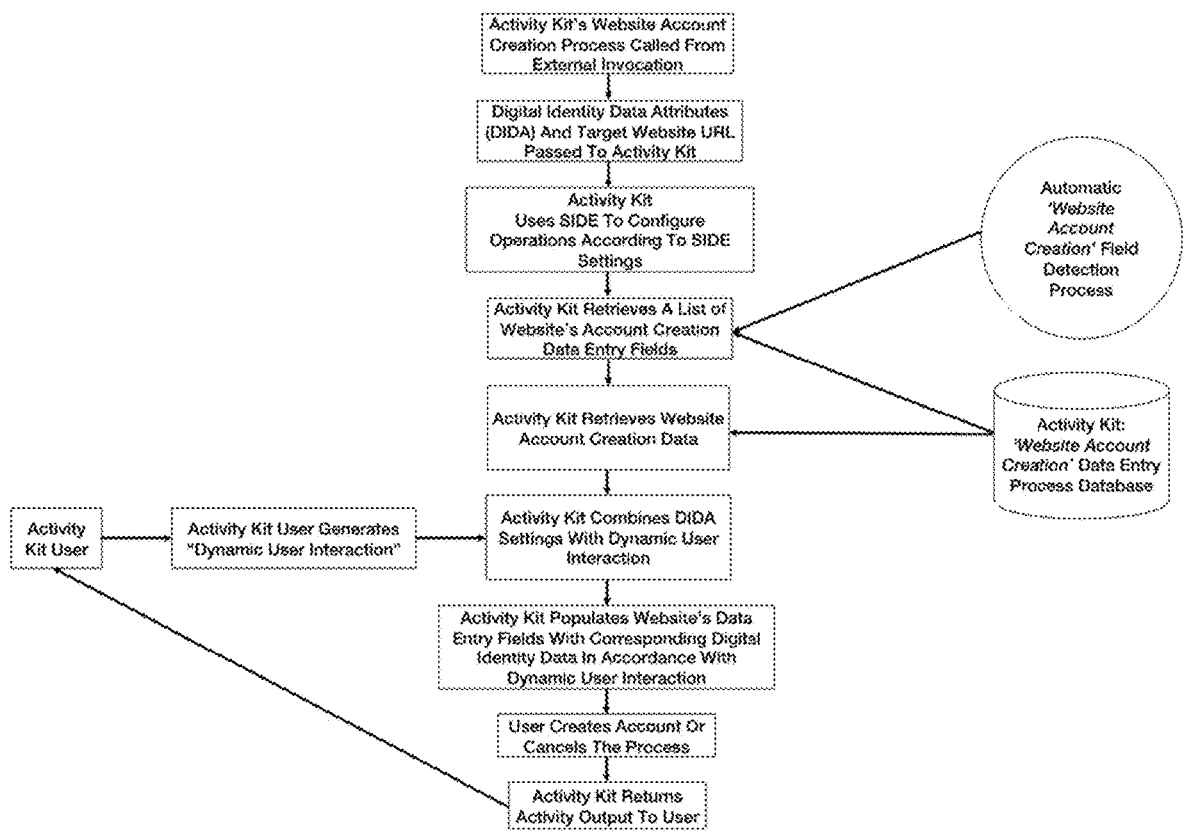
FIG. 15 illustrates activity kit account creation in accordance with an embodiment of the invention.

Regardless of whether the user is presented with the concise or guided approach to account creation, the Activity Kit will auto-fill the website's account creation input fields with corresponding information if it has been previously stored within the Digital Identity and if the stored information can be matched to the website's presented page(s). For example, if a website requests a user's name, email, and phone number, then if that information has been previously stored within the Digital Identity, then Activity Kit will either pre-populate the website's account creation data input fields or it will otherwise make it available for user-selected manual input into those fields. FIG. 15 illustrates processing operations associated with an embodiment of Activity Kit account creation process in addition to automating the account creation process for remote websites, Activity Kit may also automate the website login process when a user visits an account-protected website. For example, most websites require a user name and a password. In such instances, Activity Kit may pre-populate or auto-fill the user name and password data into the website's corresponding data entry fields if the requisite data has already been stored within the Digital Identity and if it can be matched to the website's presented page fields. The automated login function will also attempt to launch (e.g., press 'Enter') the login process if that is allowed by the target website.

Figure 16:
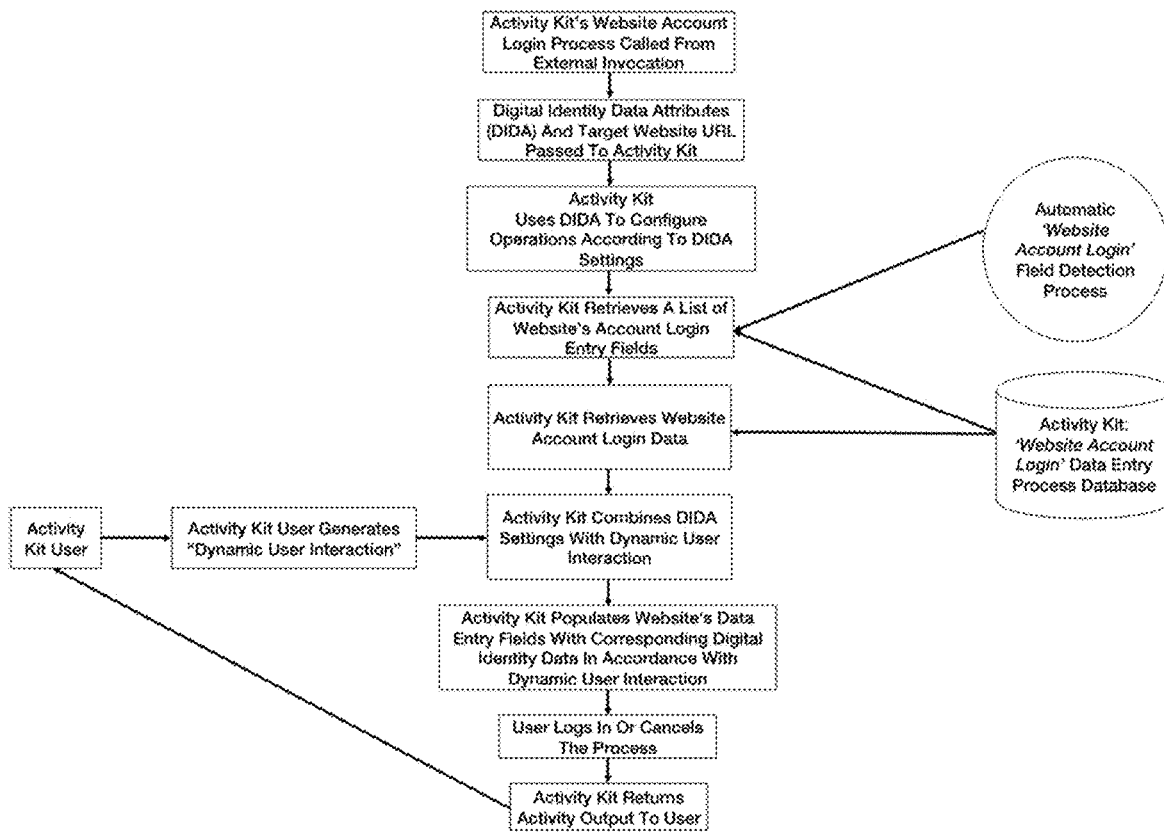
FIG. 16 illustrates activity kit login operations performed in accordance with an embodiment of the invention.

The data that may be automatically input into either the account creation or account login fields will have been previously stored within the Digital Identity by the user undergoing the Website Account Creation process provided by Activity Kit, manually entering this information, or even copying this information from other areas within the Digital Identity's information store. An example of copying information from other areas within a Digital Identity is when a user has previously specified their email address and such is requested by a website's login process. In this case, a user may authorize the Activity Kit to automatically input specific pieces of information into the website's corresponding data entry fields. FIG. 16 illustrates processing operations associated with Activity Kit automation.

Figure 17:
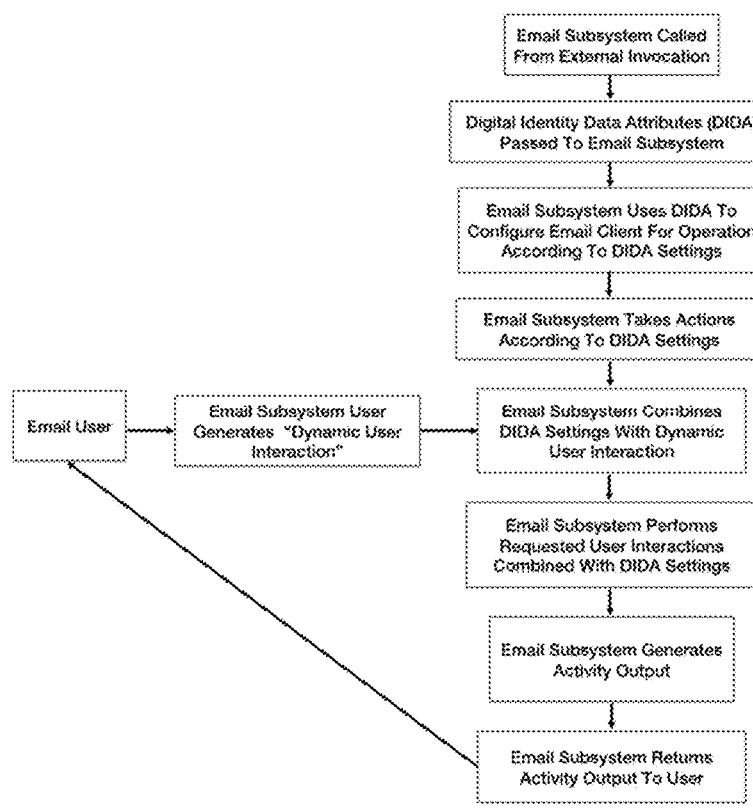
FIG. 17 illustrates email processing operations associated with an embodiment of the invention.

The purpose of the Email Kit is to create, operate, and potentially delete one or more Email Accounts related to a given Digital Identity. FIG. 17 illustrates processing operations associated with an embodiment of Email Kit. Email Kit performs all of the necessary email account management functions, such as (but not limited to):
- Determine the availability of a user's requested email address
- Create new email account (with requested email address) on remote email server
- Create a local email account (including allocating storage for) to communicate with remote email server and manage email interactions with the local user
- Communicate with the email server to exchange (send/receive/delete/etc.) email data and information for the Digital Identity user
- Delete (or deactivate) local email account when requested
- Delete (or deactivate) server-side email account when requested With an operating Email Account, the Email Kit will perform all of the operational email account functions, such as (but not limited to):
- Compose a new email
- Send/forward/respond to an email
- Receive incoming email
- Delete emails
- Store emails (e.g., on server, or local data store)
- List emails
- Present emails to the user
- Archive emails
- Notify (via Notifications Kit) the user of received emails, online status, etc.
- Search for desired emails based on email attribute (e.g., to, from, subject, date, body, etc.)
- Issue, obtain & revoke an S/MIME Certificate
- Encrypt/decrypt emails
- Sign/Verify signatures for emails The purpose of the Messages Kit is to create, operate, and potentially delete one or more Messaging Accounts related to a given Digital Identity. In this capacity, Messages Kit performs all of the necessary message account management functions, such as (but not limited to):
- Determine the availability of a user's requested messaging ID
- Create new messaging account (with requested messaging ID) on remote messaging server
- Create a local messaging account (including allocating storage for) to communicate with remote messaging server and manage messaging interactions with the local user
- Communicate with the messaging server to exchange (send/receive/delete/etc.) message data and information for the Digital Identity user
- Delete (or deactivate) local messaging account when requested
- Delete (or deactivate) server-side messaging account when requested With an operating Messaging Account, the Messaging Kit performs all of the operational messaging account functions, such as (but not limited to):
- Compose a new message
- Send/forward/respond to a message
- Receive incoming messages
- Delete messages
- Store messages (e.g., on server, or local data store)
- List messages
- Present messages to the user
- Archive messages
- Notify (via Notifications Kit) the user of received messages, online status, etc.
- Search for desired messages based on message attribute (e.g., to, from, group, date, body, etc.)
- Issue, obtain & revoke encryption data to encrypt/decrypt messages
- Encrypt/decrypt messages
- Sign/Verify signatures for messages The purpose of the Contacts Kit is to manage any Contact Information saved (automatically or manually) by the Digital Identity user. A Contact information may consist of a wide range of custom information (i.e., differing and unique information as defined on a case-by-case basis by the user) or predefined Contact Information fields, such as:

Name
Address(es)
Phone number(s)
Email address(es)
Messaging address(es)
Home page
Birthday
Profile(s)
Notes
etc The Contacts Kit's purpose is to manage this Contact information by securely storing, retrieving, deleting, searching, enabling user edits of sending, receiving, updating, etc. In some embodiments, the Contacts Kit may work together with other kits, such as the Email Kit (or Messaging Kit) to capture any Contact information attached to incoming mails, to enable contact searching when composing an email, to attach personal Contact Information to outgoing email s (if desired), etc.

The Analytics Kit exposes methods for registering analytics events within Apps. The type of analytics events will vary widely depending on the specific target application and particular usage. Some analytics may include events such as: logging information, operation speed, number of web accesses, response time for user action, etc. The Analytics Kit will collect the data and information recorded through registered analytics events implemented in all of the various Kits and the managing application.

The Voice Kit manages calling for both phone numbers and non-phone numbers (e.g., voice over IP call to another digital application's user). The Voice Kit also manages the reception of calls from other calling sources. In addition to managing the voice aspects of calls, the Voice Kit also manages call records, implements voicemail recording and playback, etc.

The Telephony Kit manages the searching and provisioning of Telephony Resources and operates at a lower-level than Voice Kit in that it interfaces with the API's provided by calling services to connect to their respective telephony systems (e.g., VoIP calling service). The Telephony Kit may also include the telephony aspects of searching based on location information (e.g., city, state, country, GPS coordinates, etc.)

In one embodiment, the Reputation Kit's purpose is to manage a Digital Identity's reputation. Such a process is described in commonly owned U.S. Pat. No. 9,703,986, the contents of which are incorporated herein by reference.

In another embodiment, the Reputation Kit's purpose is to manage the Reputation of an entity. Entities include (but are not limited to): a Digital Identity, a Legal Identity, an email address, a message ID, a phone number, a web domain, etc. A Reputation is a score calculated based on the 'goodness' of the particular entity. This 'goodness' or Reputation score can be based on a wide range of factors, such as 'welcome' emails/messages/calls, constructive communications, call stability, timely responses, etc. While a few example Reputation criteria have been listed as examples, it is important to note that a wide range of criteria can be added or substituted, which may include additional user-defined criteria.

The Marketplace Kit provides an API for Digital Identities to interface with the Digital Identity Marketplace. Some of the functionality can include the ability to transfer a Digital Identity from one user account to another user account, to view Digital identities available for transfer, to receive notifications of available Digital Identities, etc. The Marketplace Kit will also provide (via its API and internal functionality) all of the functionality to securely and privately transfer a Digital Identity from one user account to another user account and coordinate with other Kits to ensure that all the requirements for making this type of transfer are provided, supported, and met.

Figure 18:
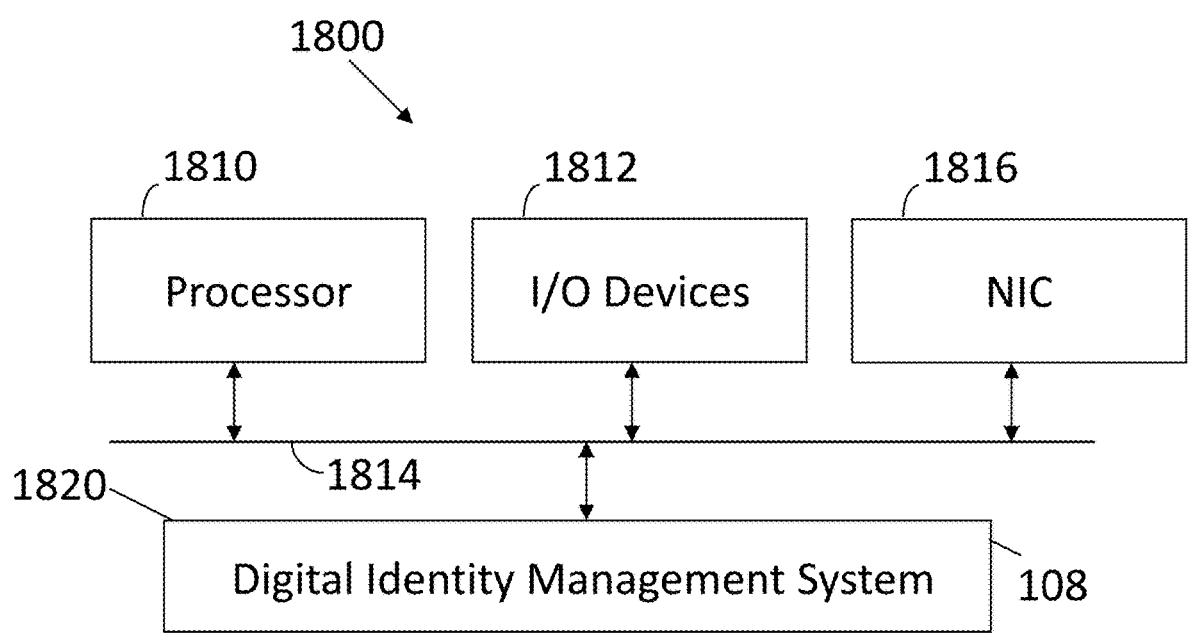
FIG. 18 illustrates a computer configured in accordance with an embodiment of the invention.

FIG. 18 illustrates a machine 1800 configured in accordance with an embodiment of the invention. The machine 1800 includes a processor 1810 connected to a set of input/output devices 1812 via a bus 1814. The input/output devices 1812 may include a keyboard, mouse, touch display and the like. The machine also includes a network interface circuit 1816 connected to the bus 1814 to provide connectivity to a network, which may be any combination of wired and wireless networks. A memory 1820 is also connected to the bus 1814. The memory 1820 stores a digital identity management system 108 with instructions executed by the processor 1810 to implement operations disclosed herein. Machine 1800 may be a server or set of servers to implement the disclosed operations. Another machine with similar attributes may store in its memory a digital identity application 100 with the attributes disclosed herein. Such a machine may be a client device, such as a computer, tablet, smart phone, wearable device and the like.

An embodiment of the present invention relates to a computer storage product with a computer readable storage medium having computer code thereon for performing various computer-implemented operations. The media and computer code may be those specially designed and constructed for the purposes of the present invention, or they ma be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"); programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the at to best utilize the invention and various embodiments with various modifications as are suited to the particular use contemplated. It is intended that the following claims and their equivalents define the scope of the invention.

The invention claimed is:

1. An apparatus, comprising:
   a processor; and
   a memory connected to the processor, the memory storing instructions executed by the processor to:
   store identity attributes including real identity attributes for a real individual and a plurality of digital identities corresponding to the real individual, each digital identity having unique digital identity data attributes defined in a permissions manifest with annotations depicting specific digital identity data accessible by a plurality of digital identity applications, and
   host a digital identity management system that communicates with the plurality of digital identity applications that observe a common application program interface, wherein each digital identity application implements at least one digital network function for the digital identity and wherein the plurality of digital identity applications utilize the plurality of digital identities and wherein the digital identity management system verifies that each of the plurality of digital identity applications is compliant with digital identity management system standards; and
   the apparatus in combination with a client device including a second processor and a second memory connected to the second processor, the second memory storing instructions executed by the second processor to
   implement a digital identity management controller to perform database operations to securely create, delete, update, copy and manage the digital identity data attributes and to encrypt and decrypt a database of digital identity data attributes,
   implement a telephony operation in accordance with the digital identity data attributes, and
   implement an email operation in accordance with the digital identity data attributes.

2. The apparatus of claim 1 wherein the digital network function is implemented in accordance with the digital identity data attributes.

3. The apparatus of claim 1, wherein the second memory stores instructions executed by the second processor to translate a kit data model to a service resource data model.

4. The apparatus of claim 1, wherein the second memory stores instructions executed by the second processor to synchronize service resources.

5. The apparatus of claim 1, wherein the second memory stores instructions executed by the second processor to authenticate access requests from applications seeking to access the digital identity data attributes.

6. The apparatus of claim 1, wherein the second memory stores instructions executed by the second processor to implement a digital identity management controller to manage access control tokens for the digital identity data attributes.

7. The apparatus of claim 1, wherein the second memory stores instructions executed by the second processor to implement a digital identity data store with encrypted digital identity data attributes.

8. The apparatus of claim 1, wherein the second memory stores instructions executed by the second processor to implement a local digital identity application.

9. The apparatus of claim 1, wherein the second memory stores instructions executed by the second processor to implement a third party digital identity application.

10. The apparatus of claim 1, wherein the second memory stores instructions executed by the second processor to implement an external application.

11. The apparatus of claim 1, wherein the second memory stores instructions executed by the second processor to implement peer-to-peer communications.

12. The apparatus of claim 1, wherein the second memory stores instructions executed by the second processor to implement an account management operation in accordance with the digital identity data attributes.

13. The apparatus of claim 1, wherein the second memory stores instructions executed by the second processor to implement a pay management operation in accordance with the digital identity data attributes.

14. The apparatus of claim 1, wherein the second memory stores instructions executed by the second processor to implement a notification operation in accordance with the digital identity data attributes.

15. The apparatus of claim 1, wherein the second memory stores instructions executed by the second processor to implement a browser operation in accordance with the digital identity data attributes.

* * * * *